United States Patent
Andersen et al.

(10) Patent No.: US 9,538,875 B2
(45) Date of Patent: Jan. 10, 2017

(54) SPREAD CONTAINER

(71) Applicant: NOVOPACK APS, Aabenrå (DK)

(72) Inventors: Lasse Nørgaard Andersen, Kibæk (DK); Birgitte Madsen, Herning (DK); Daniel Amkær Sørensen, Herning (DK); Martin Dyreborg Hansen, Herning (DK); Lone Brit Nielsen, Engesvang (DK)

(73) Assignee: NOVOPACK APS, Aabenrå (DK)

(*) Notice: Subject to any disclaimer, the term of this patent is extended or adjusted under 35 U.S.C. 154(b) by 9 days.

(21) Appl. No.: 14/290,002

(22) Filed: May 29, 2014

(65) Prior Publication Data
US 2014/0270895 A1    Sep. 18, 2014

Related U.S. Application Data

(63) Continuation of application No. PCT/DK2012/000127, filed on Nov. 29, 2012.

(30) Foreign Application Priority Data

Nov. 29, 2011   (DK) .................................. 2011 00934

(51) Int. Cl.
*A47J 9/00* (2006.01)
*B65D 75/22* (2006.01)
(Continued)

(52) U.S. Cl.
CPC ................ *A47J 9/001* (2013.01); *B65D 75/22* (2013.01); *B65D 75/58* (2013.01); *B65D 83/00* (2013.01); *B65D 2221/00* (2013.01)

(58) Field of Classification Search
CPC .......... A47J 9/001; B65D 85/72; B65D 85/74; B65D 85/76; B65D 35/36; A47G 21/004
(Continued)

(56) References Cited

U.S. PATENT DOCUMENTS 5,894,959 A *  4/1999  Sigurlidason ........ A47G 21/005
                                                      401/266
2001/0045374 A1  11/2001  Selker
(Continued)

FOREIGN PATENT DOCUMENTS

GB        2421489        6/2006
WO     WO2013/079069    6/2013

OTHER PUBLICATIONS

International Search Report for PCT Patent App. No. PCT/DK2012/000127 (Apr. 10, 2013).

*Primary Examiner* — Jennifer C Chiang
*Assistant Examiner* — Bradley Oliver
(74) *Attorney, Agent, or Firm* — Cermak Nakajima & McGowan LLP; Adam J. Cermak

(57) ABSTRACT

A spread container (2) includes a housing (6) configured to contain a spreadable material (4), a knife member (8) attached to or integrated into the housing (6), where the knife member (8) is configured to spread the spreadable material (4). The spread container (2) has a sealed opening (10) sealed by a seal (12), which opening (10) is configured to be opened by squeezing or pressing at least a portion of the housing (6) in such a manner that the spreadable material (4) can be dispensed through the opening (10). The opening (10) is arranged in such a way that the spreadable material (4) is dispensed onto the knife member (8) and flows in a direction towards the distal end (14) of the knife member (8).

9 Claims, 5 Drawing Sheets

(51) Int. Cl.
*B65D 75/58* (2006.01)
*B65D 83/00* (2006.01)

(58) Field of Classification Search
USPC .................................................. 401/261, 266
See application file for complete search history.

(56) References Cited

U.S. PATENT DOCUMENTS

| | | |
|---|---|---|
| 2008/0112750 A1 | 5/2008 | Thomson |
| 2009/0028629 A1 | 1/2009 | deVirag et al. |
| 2009/0297248 A1* | 12/2009 | Martin, Jr. ........... A47G 21/004 |
| | | 401/261 |

* cited by examiner

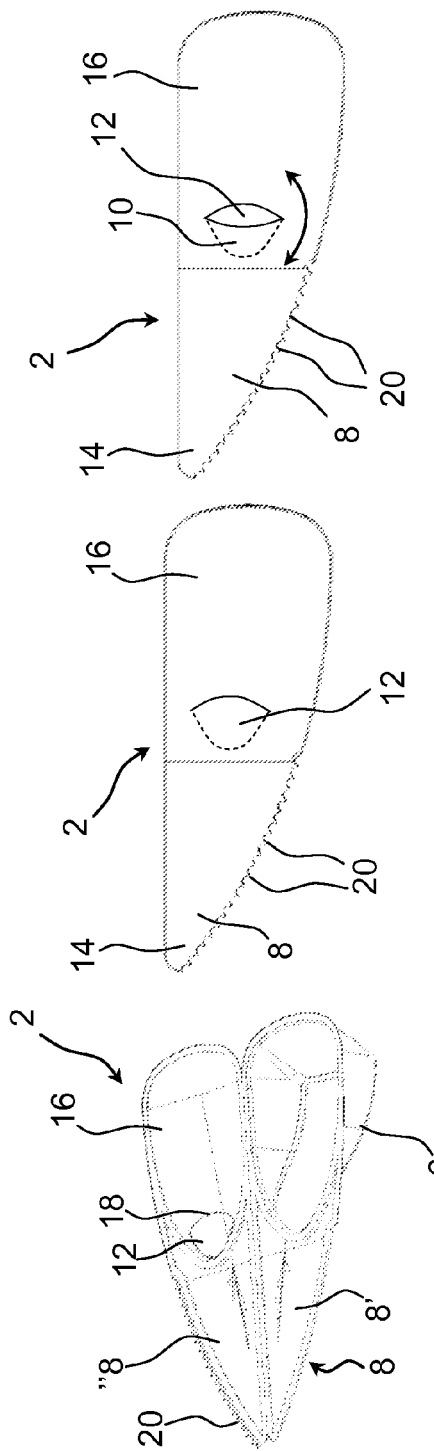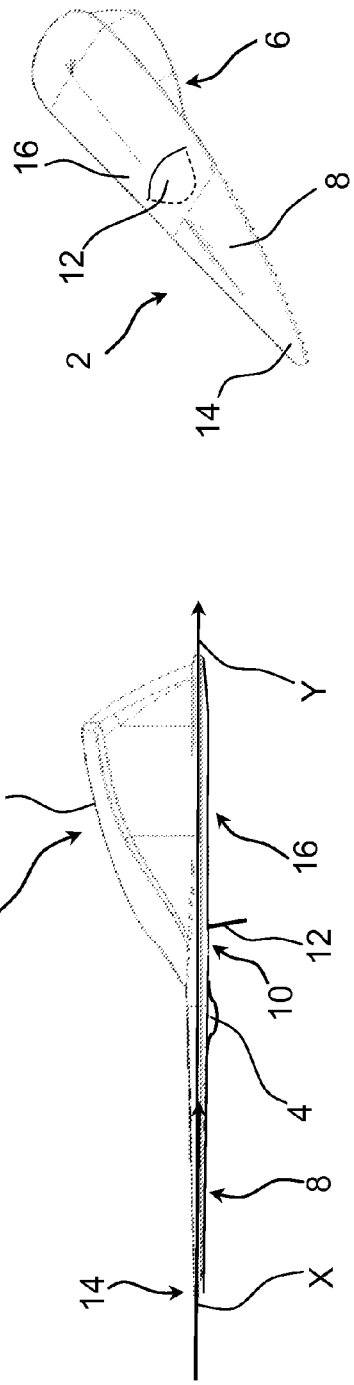

SPREAD CONTAINER

This application is a Continuation of, and claims priority under 35 U.S.C. §120 to, International App. No. PCT/DK2012/000127, filed 29 Nov. 2012, and claims priority under 35 U.S.C. §§119, 365 therethrough to Danish App. No. PA 2011 00934, filed 29 Nov. 2011, the entireties of which are incorporated by reference herein.

BACKGROUND

Field of Endeavor

The present invention generally relates to a spread container for spreading a spreadable material. The present invention more particularly relates to a spread container that is configured to spread a spreadable material to bread in a fast, easy and hygienically way and at the same time eliminates the need for a separate knife to spread the spreadable material.

Brief Description of the Related Art

Small portion container of butter, jam and other types of spreadable material are commonly known and available, e.g., at hotels, canteens, airplanes, trains and restaurants. Various types of spreadable material is used for bread, pancake by way of example. When a tool is available the tool may be used to spread the butter, jam or whatever type of spreadable material that is desired. However; when there is no tool available it may be very difficult to spread a layer of, e.g., butter on a toast.

In many situations (e.g., in airplanes) it would be desirable to have an alternative that eliminates the need for a separate tool to spread the spreadable material. Therefore, several attempts have been made to produce a spread container that eliminates the need for separate knife to spread the spreadable material in the container.

U.S. Patent App. Pub. No. 2008/112750 A1 discloses a spread container comprising a housing containing a spreadable material. The container moreover comprises a spatula which in use is joined to the container. The spatula is made as an extension of a wall of the housing which extends in use beyond the periphery of the housing. The housing is a squeeze-pack incorporating one or more fold lines which allow the container to be collapsed on itself about those lines in concertina fashion when a user squeezes the container. It requires, however, a relative large force to dispense the spreadable material out of the container due to the outlet structures.

Thus, there is a need for a spread container which reduces or even eliminates the above mentioned disadvantages of the prior art.

Accordingly, it is an object of the present invention to provide an easy dispensable spread container that is configured to spread a spreadable material in a fast, easy and hygienically way.

It is also an object of the present invention to provide a spread container that can be dispensed in a way that makes it easy to spread the spreadable material to a piece of bread in a fast, easy and hygienically way.

SUMMARY

One of numerous aspects of devices embodying principles of the present invention includes spread containers explained in the following description and illustrated in the accompanying drawings.

A spread container according to principles the present invention includes a spread container comprising:

a housing configured to contain a spreadable material;

a knife member attached to or integrated into the housing, where the knife member is configured to spread the spreadable material;

a sealed opening sealed by a seal, which opening is configured to be opened by squeezing or pressing at least a portion of the housing in such a manner that the spreadable material can be dispensed through the opening. The opening is arranged in such a way that the spreadable material is dispensed onto the knife member and flows in a direction towards the distal end of the knife member.

Hereby it is achieved that the spread container can be used to spread a spreadable material in a fast, easy and hygienic way. The spreadable material can be dispensed by using a relative small force.

The housing may have any stable shape; however, it is important that the opening can be opened by squeezing or pressing at least a portion of the housing. Accordingly, it is preferred that the housing is made in a flexible material, e.g., a plastic material.

The knife member may be a separate part or a part that is integrated into other parts of the spread container. The knife member may have any suitable shape; however, it is preferred that the knife member is configured to be used to cut and slice a piece of bread. Hereby the spread container can be more user-friendly.

The opening and seal may have any suitable shape; however, it is preferred that the opening and the seal that is sealing the opening are shaped in a manner that facilitates that the spreadable material is dispensed and flows towards the distal end of the knife member.

It is possible to have a sealed opening that facilitates that the spreadable material is dispensed and flows towards the distal end of the knife member even when the seal is removed completely from the opening. The sealing may be a peelable sealing.

The opening may be configured to be opened by squeezing or pressing a minor portion of the housing, however, it is also possible that the opening may be configured to be opened by squeezing or pressing a major portion of the housing.

By having an opening that is arranged in such a way that the spreadable material is dispensed onto the knife member and flows in a direction towards the distal end of the knife member it is achieved that the spreadable material easily can be spread by using the knife member, e.g., onto a piece of bread.

It is preferred that the opening is arranged in such a way that the spreadable material is displaced in a manner so that the spreadable material flows towards the distal end of the knife member.

It may be an advantage that the knife member is configured to cut and/or slice a piece of bread such as a bread roll.

Hereby the spread container can be used both to slice/cut and spread. Accordingly, the spread container eliminates the need for a knife to do the cutting and spreading action.

Advantageously, the knife member is provided with saw teeth. Saw teeth make it easier to cut and slice, e.g., bread.

It is preferred that the knife member is provided with an edge having saw teeth.

It may be an advantage that the spread container comprises a basically bowl-shaped housing covered with a basically plate-shaped lid member.

Hereby the spread container has an optimum shape in order to be compact and still be capable of containing a significant portion of spreadable material.

It may be an advantage that the basically bowl-shaped housing is provided with a protruding edge extending along the periphery of the basically bowl-shaped housing and that the opening and the seal sealing it are arranged within the periphery of the basically bowl-shaped housing.

Hereby, it is achieved that the spreadable material can be dispensed from the housing in a direction through the opening onto the knife member in a manner in which the spreadable material flows in a direction towards the distal end of the knife member. Moreover, it is possible to make an opening sufficiently large to ensure that the spreadable material can be dispensed from the spread container by using relative small forces when squeezing or pressing the housing.

It is preferred that the basically bowl-shaped housing is provided with a protruding edge extending along the periphery of the basically bowl-shaped housing and that the basically plate-shaped lid member is provided with a protruding edge extending along the periphery of the lid member and corresponding to the protruding edge extending along the periphery of the basically bowl-shaped housing.

It may be an advantage that the seal is bordering on the knife member.

Hereby it is achieved that the spreadable material has optimum access to the knife member. By the term "is bordering on the knife member" is meant that the seal is arranged very near to the knife member, preferably at the border between the knife member and the lid member.

It is preferred that the seal is bordering on the knife member at the central portion of the proximal end of the knife member. Hereby an optimum spreading of the spreadable material can be achieved.

It may be an advantage that the knife member comprises a first knife member portion attached to a corresponding second knife member portion and that a space, preferable an air filled space is provided between the first knife member portion and the second knife member portion.

Hereby less material is needed to manufacture the knife member and thus the spread container. Moreover the stiffness of the knife member can be increased. This is very interesting seen from a production cost point of view.

It may be beneficial that the first knife member portion is provided with a protruding edge corresponding to a protruding edge of the second knife member portion and that these protruding edges are configured to be joined when the two halves of the spread container are joined.

It may be an advantage that the spread container comprises a first knife member portion and the lid member made as a one-piece body and that the second knife member portion and the housing is a one-piece body.

Hereby, the spread contain may be manufactured in a cost effective way, e.g., by using an injection technique.

It is preferred that the spread container comprises a first knife member portion and that the lid member is made as a one-piece body and that the second knife member portion and the housing is a one-piece body and that these two one-piece bodies are configured to be manufactured as a one-piece body.

It may be an advantage that the seal is attached to or integrated into a lid member in such a way that the seal is configured to be partly detached from the lid member and be rotatably mounted to the lid member so that the spreadable material has access to the knife member while the seal is hinged to the lid member. Hereby the seal can be used to guide the spreadable material in the desired direction towards the distal end of the knife member.

It may be an advantage that the spread container is wrapped in a wrapping. Hereby it is achieved that the spread container is kept clean and sealed against contaminations from the outside.

It is preferred that at least one of the sides of the knife member, at least partly, is covered by a foil member configured to seal the knife member against contamination.

It is preferred that the knife member extends as a continuation of the lid member and that the lid member and knife member herby constitute a basically plane surface.

A spread container according to principles of the present invention may have any suitable geometry and the housing may be made in any suitable material (e.g., a plastic material).

BRIEF DESCRIPTION OF THE DRAWINGS

The invention will become more fully understood from the detailed description given herein below. The accompanying drawings are given by way of illustration only, and thus, they are not limitative of the present invention. In the accompanying drawings:

FIGS. 2A-E show different views of another spread container according to principles of the present invention;

DETAILED DESCRIPTION OF EXEMPLARY EMBODIMENTS

Referring now in detail to the drawings for the purpose of illustrating preferred embodiments of the present invention, a spread container 2 is illustrated in FIG. 1.

Figure 1A:
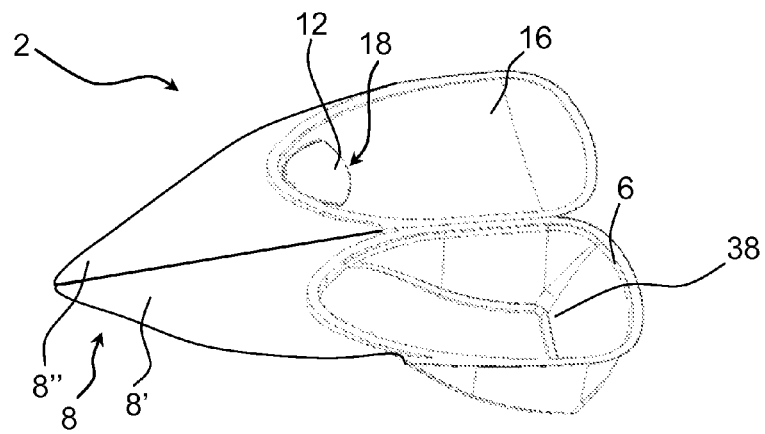
FIGS. 1A-C show different views of an exemplary spread container according to principles the present invention.

FIG. 1A illustrates a perspective view of a spread container 2 according to principles of the present invention. The spread container 2 includes a housing 6 configured to contain a spreadable material 4 (see FIG. 1C) such as butter, honey, jam, cream cheese, paste or other spreadable materials.

The spread container 2 further includes a knife member 8 having a first knife member portion 8' and a second knife member portion 8".

The spread container 2 also includes a basically plate-shaped lid member 16 configured to seal the opening 38 in the housing 6. A seal 12 is provided in the lid member 16. The seal 12 is sealing an opening 10 (see FIG. 1C) in the lid member 16. The seal 12 is configured to be hinged at an arced hinge member 18.

The spread container 2 is shown in an open state, in which it is possible to fill it up with a spreadable material. However, the two halves of the spread container 2 need to be joined (e.g., by a welding process, such as ultrasonic welding, by way of example).

Figure 1B:
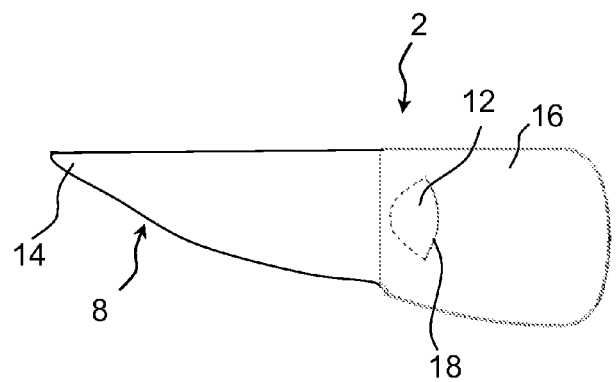

FIG. 1B illustrates a top view of the spread container 2 shown in FIG. 1A. The two halves of the spread container 2 have been joined and it can be seen that the spread container 2 includes a knife member 8 having a pointed distal end 14. The spread container 2 includes a lid member 16 that is provided with an opening 10 (see FIG. 1C) that is covered and sealed by a seal 12. The hinge member 18 is also visible in FIG. 1B and it can be seen that the hinge member 18 is convex relative to the distal end 14 of the knife member 8.

Figure 1C:
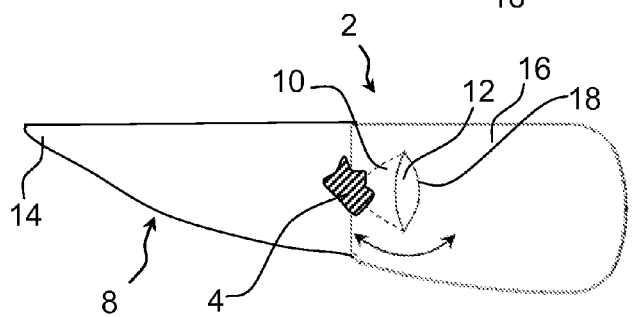

FIG. 1C illustrates another top view of the spread container 2 shown in FIG. 1A and FIG. 1B. The opening 10 has been opened by squeezing or pressing a portion of the housing 6 in such a manner that the seal 12 has been partly detached from the lid member 16 so that the spreadable material 4 have been dispensed through the opening 10. It can be seen that the seal 12 is mechanically attached to the lid member 16 by the arced hinge member 18.

Moreover, it can be seen that the spreadable material 4 is being dispensed onto the knife member 8 and flows in a direction towards the distal end 14 of the knife member 8. It is essential that the seal 12 is detached in a manner so that the seal 12 does not complicate or impede the spreadable material 4 from being dispensed through the opening 10.

FIG. 2A illustrates a perspective view of another open spread container 2 embodying principles of the present invention. The only difference when compared to the spread container 2 shown in FIGS. 1A-C is that the spread container 2 includes a saw toothed edge provided with a plurality of saw teeth 20. These saw teeth 20 makes the spread container 2 configured to cut and/or slice a piece of bread or a bread roll. It is important that the knife member 8 is stiff enough to cut and/or slice a piece of bread.

FIG. 2B illustrates a top view of the spread container 2. It can be seen that the opening 10 is sealed completely by the seal 12. Accordingly, the opening 10 is not visible.

In FIG. 2C, however, the seal 12 is partly detached from the lid member 16. Therefore, it is possible for the spreadable material 4 within the housing 6 of the spread container 2 to be dispensed through the opening 10 in the lid member 16.

FIG. 2D illustrates a side view of a spread container 2 embodying principles of the present invention. The spread container 2 includes a knife member 8 that extends as a continuation of the lid member 16. In fact the longitudinal axis X of the knife member 8 corresponds to the longitudinal axis Y of the lid member 16.

In FIG. 2D spreadable material 4 contained by the housing 6 of the spread container 2 has been dispensed through the opening 10 in the lid member 16 on to the knife member 8. Accordingly, the spread container 2 is ready to be used to spread the spreadable material 4 to, e.g., a piece of bread.

It can be seen that the seal 12 is hinged to the lid member 16 and that the spreadable material 4 has access to the knife member 8 through the opening 10. Accordingly, by pressing or squeezing the housing 6 of the spread container 2, the spreadable material 4 can be further dispensed through the opening 10 in the lid member 16.

FIG. 2E illustrates a perspective top view of the spread container 2 shown in FIG. 2D before the seal 12 has been (partly) detached from the lid member 16.

Figure 3:
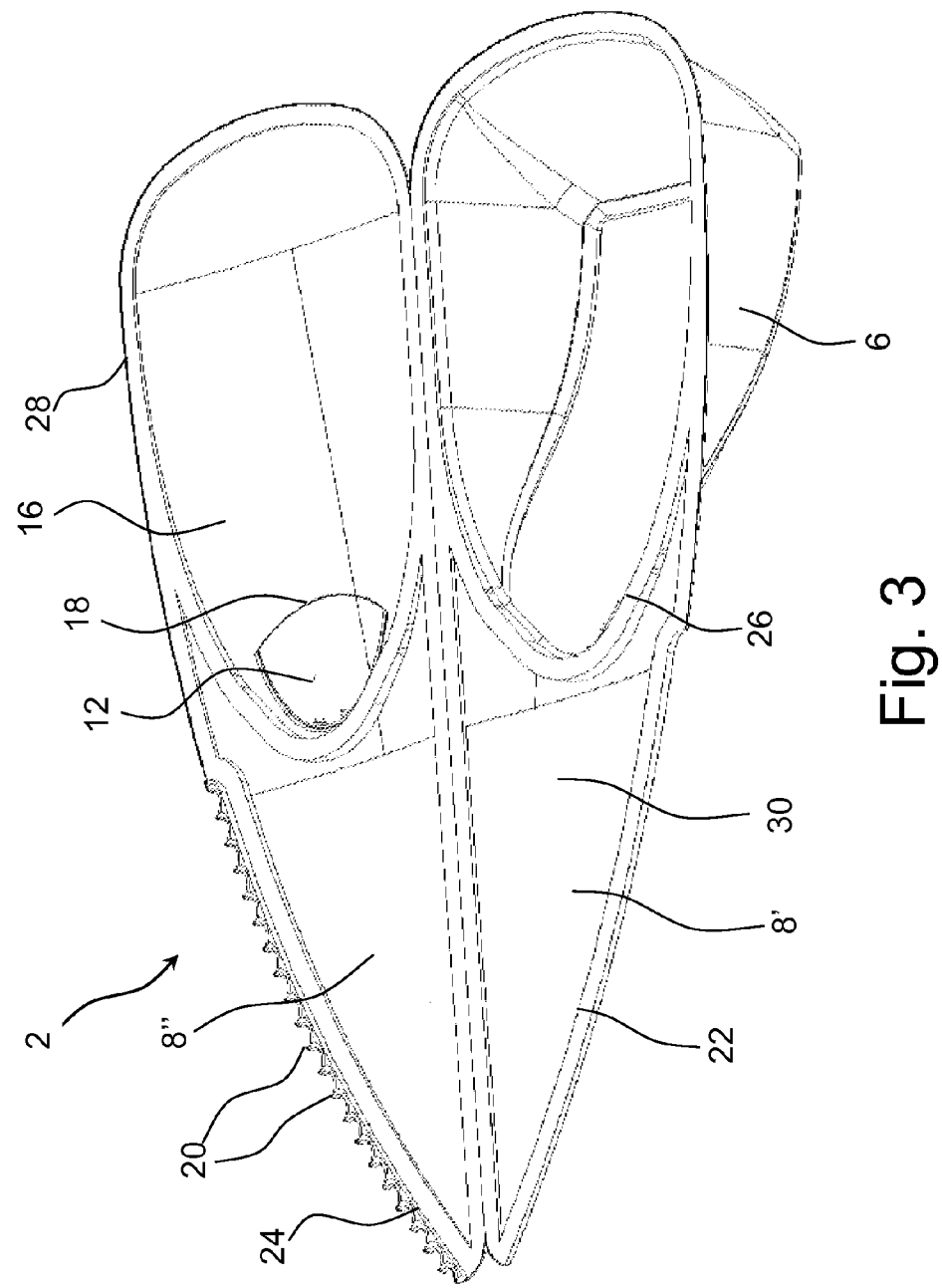
FIG. 3 shows a close-up perspective view of a spread container according to principles of the present invention.

FIG. 3 illustrates a close-up perspective view of a preferred embodiment of a spread container 2 according to principles of the present invention.

The spread container 2 includes a basically bowl-shaped housing 6. The basically bowl-shaped housing 6 is provided with a protruding edge 26 extending along the periphery of the housing 6. The spread container 2 includes a basically plate-shaped lid member 16 that is provided with a protruding edge 28 extending along the periphery of the lid member 16. The protruding edge 28 corresponds to the protruding edge 26.

The protruding edges 26, 28 are configured to be joined by a welding process (e.g., by using ultrasonic welding).

The spread container 2 includes a knife member 8 having a first knife member portion 8' attached to a corresponding second knife member portion 8". The first knife member portion 8' is configured to be joined to the second knife member portion 8", e.g., by a welding process. An area 30 is configured to constitute an air filled space 30 when the first knife member portion 8' and the second knife member portion 8" are joined.

Accordingly, an air filled space 30 will be provided between the first knife member portion 8' and the second knife member portion 8" that is provided with saw teeth 20. Hereby, less material is needed to manufacture the knife member 8 and thus the spread container 2.

Accordingly, the production cost can be reduced. It is important to note that the first knife member portion 8' is provided with a protruding edge 22 corresponding to a protruding edge 24 of the second knife member portion 8". These protruding edges 22, 24 are configured to be joined when the two halves of the spread container 2 are joined.

Figure 4:
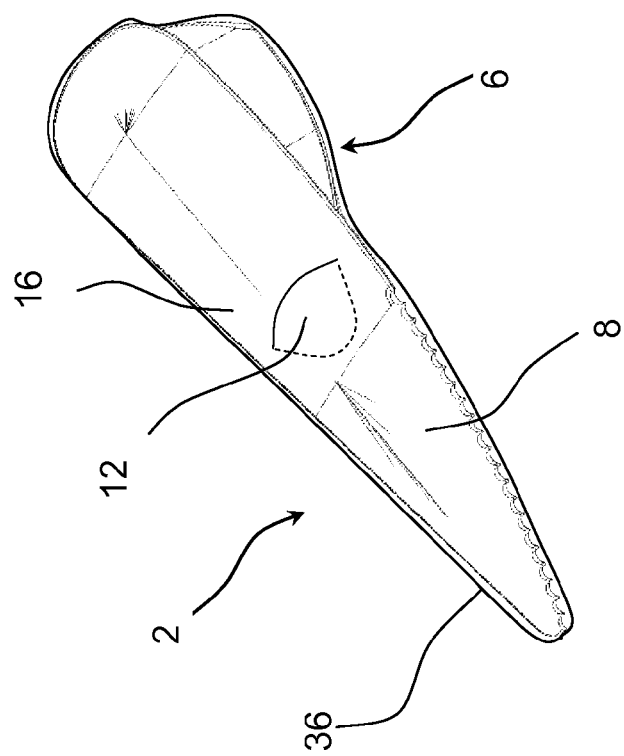
FIG. 4 shows a perspective view of a wrapped spread container according to principles of the present invention and FIG. 5 shows a cross-sectional view of a knife member of a spread container according to principles of the present invention.

FIG. 4 illustrates a perspective view of a wrapped spread container 2 according to principles of the present invention. The spread container 2 includes a housing 6 sealed with a plate-shaped lid member 16 that is provided with an opening that is sealed and covered with a seal 12. The spread container 2 moreover includes a knife member 8 extending along the longitudinal axis of the lid member 16. The spread container 2 is wrapped with a wrapping 36 that ensures that the spread container 2 is clean and kept clean until the wrapping 36 is broken in order to use the spread container 2. The wrapping 36 may be any suitable type of wrapping.

Figure 5:
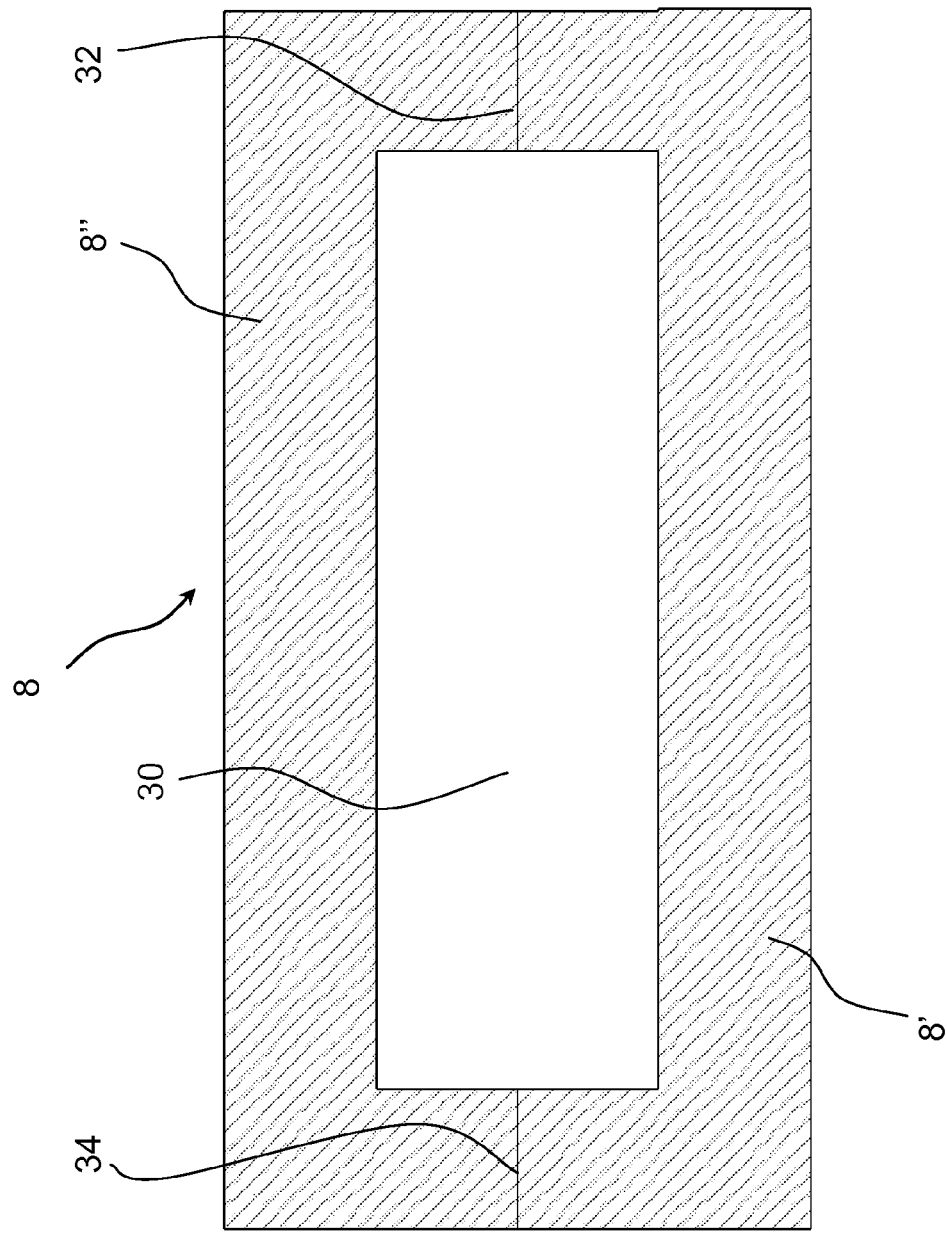

FIG. 5 illustrates a cross-sectional view of a knife member 8 of a spread container embodying principles of the present invention. The knife member 8 includes a first knife member portion 8' and a second knife member portion 8" that are joined by a first joint 32 and a second joint 34. The joints 32, 34 join the protruding edge 22 of the first knife member portion 8' and the protruding edges 24 of the second knife member portion 8".

An air filled space 30 is provided between the first knife member portion 8' and the second knife member portion 8". In order to make the knife member 8 more stiff and in order to reduce the quantity of material.

LIST OF REFERENCE NUMERALS

2—Spread container
4—Spreadable material
6—Housing
8—Knife member
8'—First knife member portion
8"—Second knife member portion
10—Opening
12—Seal
14—Distal end
16—Lid member
18—Hinge member
20—Saw tooth
22—Protruding edge
24—Protruding edge
26—Protruding edge
28—Protruding edge
30—Area
32—Joint
34—Joint
36—Wrapping 38—Opening
X—Longitudinal axis
Y—Longitudinal axis While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A spread container comprising:
   a housing configured to contain a spreadable material;
   a knife member attached to or integrated into the housing, the knife member having a proximal end and a distal end, a distance from the proximal end to the housing being shorter than a distance from the distal end to the housing, and wherein the knife member is configured to spread the spreadable material; and
   a lid having an opening and a seal covering and sealing said opening, the opening being configured to be opened by squeezing or pressing at least a portion of the housing in such a manner so that said spreadable material, when contained in said housing, is dispensed through the opening, and wherein the lid opening is arranged so that, when contained in said housing, the spreadable material is dispensed onto the knife member proximal end and flows in a direction towards the knife member distal end;
   wherein the housing comprises a bowl-shaped portion and said lid includes a plate-shaped lid member covering the bowl-shaped portion.

2. A spread container according to claim 1, wherein the knife member is configured to cut or slice a piece of bread.

3. A spread container according to claim 1, wherein the knife member comprises saw teeth.

4. A spread container according to claim 1, wherein the bowl-shaped housing portion comprises a protruding edge extending along a periphery of the bowl-shaped housing portion and the seal is arranged within said periphery of the bowl-shaped housing portion.

5. A spread container according claim 4, wherein the seal borders on the knife member.

6. A spread container according claim 1, wherein the knife member comprises:
   first and second knife member portions attached together; and
   a space between the first and second knife member portions.

7. A spread container according to claim 6, wherein:
   the first knife member portion and the lid are a one-piece body; and
   the second knife member portion and the housing are a one-piece body.

8. A spread container comprising:
   a housing configured to contain a spreadable material;
   a knife member attached to or integrated into the housing, the knife member having a proximal end and a distal end, a distance from the proximal end to the housing being shorter than a distance from the distal end to the housing, and wherein the knife member is configured to spread the spreadable material; and
   a lid having an opening and a seal covering and sealing said opening, the opening being configured to be opened by squeezing or pressing at least a portion of the housing in such a manner so that said spreadable material, when contained in said housing, is dispensed through the opening, and wherein the lid opening is arranged so that, when contained in said housing, the spreadable material is dispensed onto the knife member proximal end and flows in a direction towards the knife member distal end;
   wherein the seal is attached to or integrated into the lid so that the seal is configured to be partly detached from the lid and be rotatably mounted to the lid so that the spreadable material has access to the knife member while the seal is hinged to the lid.

9. A spread container according to claim 1, further comprising a wrapping around the spread container.

* * * * *